United States Patent [19]

Boyce

[11] 4,258,303
[45] Mar. 24, 1981

[54] ENERGY CONTROLLER FOR CONVERSION FROM A DIRECT CURRENT SOURCE TO A VARIABLE FREQUENCY LOAD

[75] Inventor: Jay Boyce, Anaheim, Calif.

[73] Assignee: Jay Boyce & Associates, Anaheim, Calif.

[21] Appl. No.: 73,646

[22] Filed: Sep. 10, 1979

Related U.S. Application Data

[63] Continuation-in-part of Ser. No. 933,656, Aug. 14, 1978, Pat. No. 4,214,196.

[51] Int. Cl.³ .......................... H02P 7/42; H02P 7/64
[52] U.S. Cl. .................................... 318/811; 318/510; 318/512
[58] Field of Search ............... 318/801, 807, 810, 811, 318/812, 510, 512, 513, 341, 345 G; 363/130, 138, 124, 135

[56] References Cited

U.S. PATENT DOCUMENTS

| 3,351,184 | 11/1967 | Lipman et al. | 363/124 |
| 3,406,325 | 10/1968 | Rosa | 318/807 |
| 3,891,913 | 6/1975 | Rao et al. | 363/135 |
| 4,128,793 | 12/1978 | Stich | 318/808 |
| 4,214,196 | 7/1980 | Boyce | 318/811 |

*Primary Examiner*—David Smith, Jr.
*Attorney, Agent, or Firm*—Willie Krawitz

[57] ABSTRACT

A turn off circuit for a multiphase motor is provided comprising a DC powered system including a three element core having a central core element and an inner and outer core element coupled thereto.

A series of capacitors are connected to an outer core element to discharge simultaneously and turn off positively and negatively biased SCRs which sequentially fire and produce a suitable pulse width and frequency to the motor.

A control system is provided to produce a variable pulse frequency and pulse width to a power circuit which sequentially fires and admits battery power to the motor.

9 Claims, 3 Drawing Figures

ENERGY CONTROLLER FOR CONVERSION FROM A DIRECT CURRENT SOURCE TO A VARIABLE FREQUENCY LOAD

BACKGROUND OF THE INVENTION

This invention is a continuation-in-part of U.S. patent application, Ser. No. 933,656 filed on Aug. 14, 1978 now U.S. Pat. No. 4,214,196.

My prior application, Ser. No. 933,656 describes a novel. three-legged core having a loose coupling between the outer cores, and a tight coupling between the central, pulse generator cores and the outer cores. To further reduce heat losses in the windings due to trapped energy in the chokes of the outer cores, an improved energy recovery system is required. In addition, it is desireable to reduce oscillations of the power SCRs which occur after firing. Also, it is desirable to facilitate recovery of energy trapped in the outer cores for return to the battery; this will occur when the load is being braked. Furthermore, since quiet operation of a turn off circuit is less annoying, besides reducing energy consumption, a quieter running circuit is obviously desireable. Finally, if energy trapped in the outer core can be more effectively transferred to the pulse forming capacitors which fire the SCRs, rather than being dissipated or retained as heat, circuit firing will be more uniform and stable, and this will improve overall efficiency.

THE INVENTION

According to the invention, a turn off circuit for a multiphase motor is provided, comprising a DC powered system including a single three element choke core having outer cores with loosely coupled outer windings to reduce rf transients, and a central core being closely coupled to each outer core to enhance pulse generation. A plurality of pulse forming capacitors are connected in parallel to one of the outer cores and function to produce uniform trapezoidal turn off pulses (preferably about 50-100 microseconds) to sequentially fire positively and negatively biased SCRs and switch DC power for the motor. Each outer core is provided with an auxiliary winding to collect trapped energy and transfer it back to the DC source such as a battery. In the case of the outer core which connects with the pulse forming capacitors, some of the excess trapped energy is transferred to these capacitors and the remainder is fed to the battery. The net result is that firing characteristics of the turn off and switching SCRs are improved, and this in turn reduces energy losses.

DESCRIPTION OF THE PREFERRED EMBODIMENT

Figure 1:
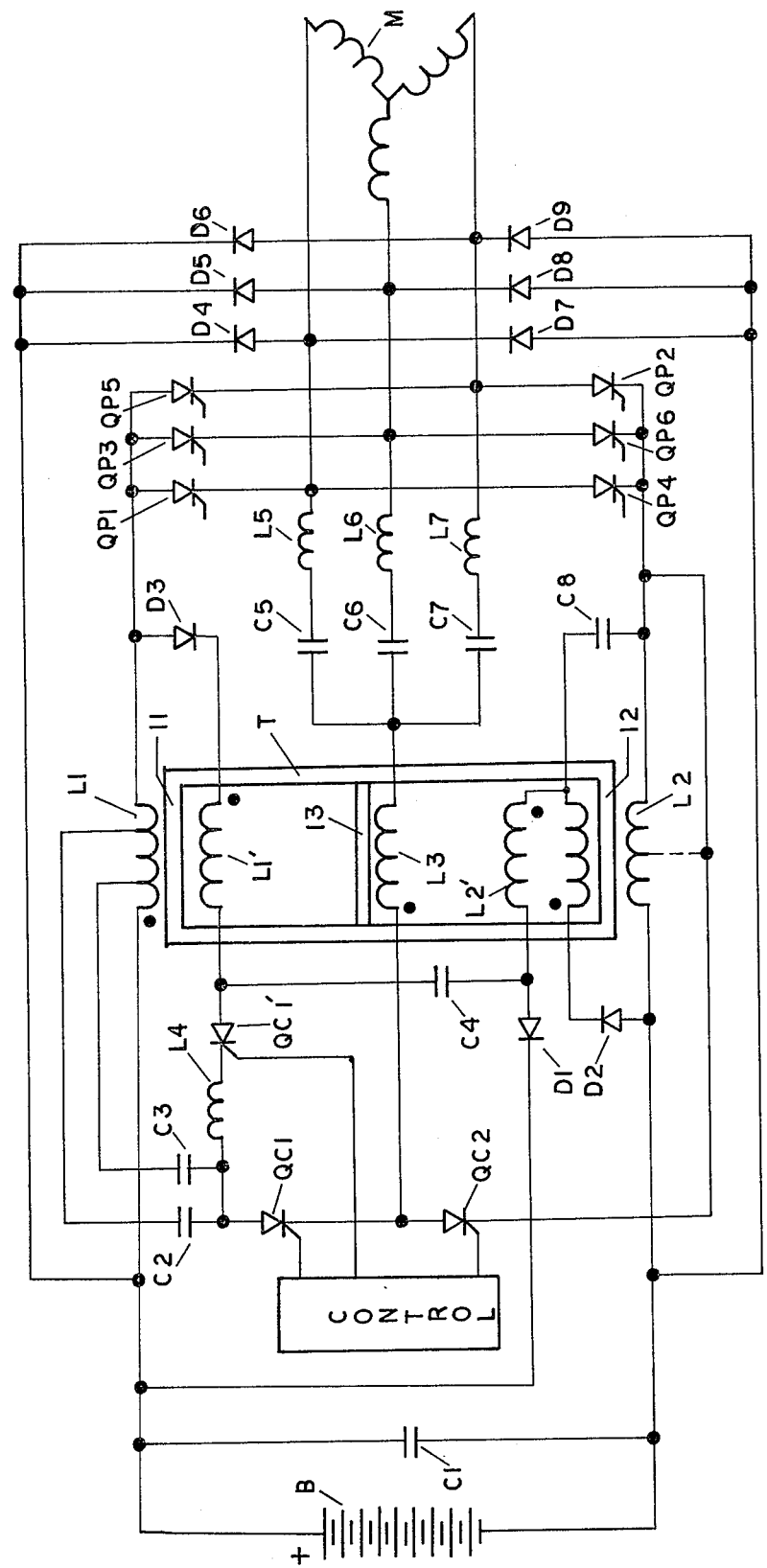
FIG. 1 is a circuit diagram of various embodiments of the transformer core and turn off circuit of this invention.

A preferred form of the turn off circuit is shown in FIG. 1, and comprises a three core transformer, T having outer core elements 11, 12 and a central core 13. The three cores have windings L1, L2 and L3 respectively. Outer windings L1 and L2 are loosely coupled to prevent rf transients, and central winding L3 is closely coupled to both outer windings L1 and L2 to enhance pulse generation. Auxiliary windings L1' and L2' are provided to transfer trapped energy from windings L1 and L2 respectively.

A capacitor C1 may be employed as an energy trap for return to the battery. The transfer of stored energy from L1 to L1' is provided by a diode D3, and SCR QC1', and a small air choke L4; the choke limits di/dt firing. Capacitor C4 is employed to prevent build up of an open circuit decay spike. Energy trapped by sinding L2' is passed from the negative terminal of a storage battery, B through a diode D2 and to the positive side of the battery through diode D1. A capacitor C8 between L2 and L2' functions to reduce pulse overshoot and pulse oscillations caused by SCR firing.

A plurality of parallel connected capacitors C2, C3 - - - Ci, are connected on one side to the winding L1, and on the other side to turn off SCRs QC1, QC2. These capacitors produce uniform, trapezoidal turn off pulses to the SCRs which switch DC power to the motor. Positively biased power switching SCRs QP1, QP3 and QP5, and negatively biased SCRs QP4, QP6 and QP2 (International Rectifier 151 RF 40) are employed to sequentially turn on power from the battery to a three-phase motor, M. The turn on sequence for the SCRs is QP1, QP2, QP3, QP4, QP5 and QP6. SCRs QC1, QC1' and QC2 are provided to turn off the positive and negative biased SCRs respectively in alternate sequence and 180° out of phase, control for firing these SCRs being supplied by a control circuit, described infra, which provides sequencing control and switching speeds in response to demand.

Capacitor-inductor pairs C5-L5, C6-L6 and C7-L7 receive the pulsed discharge of capacitors C2, C3 - - - Ci to switch the SCRs, the capacitor-inductor pairs being employed as smoothing filters and to reduce dv/dt firing. In addition, capacitors C5, C6 and C7 store and discharge energy through L3 and QC2 into L2, and thus through L2' back to the battery.

Diodes D4-D9 enable surge currents to be returned to the battery via L3 and L2' and to the pulse forming capacitors C2, C3 - - - Ci.

When the pulse forming capacitors C2, C3 - - - Ci are charged and any power SCR is conducting, SCR QC1 is fired and the capacitors C2, C3 - - - Ci discharge into the pulse generator L3 to produce the following results:

a. the pulse produced in L3 forms a current pulse of equal magnitude and opposite polarity in L1;

b. this in turn, reduces the voltage on the anodes of power switching SCRs QP1, QP3 and QP5;

c. the discharge of capacitors C2, C3 - - - Ci draws current from the taps on L1 which diverts the load current ot the capacitors and prolongs the current diversion as a trapezoidal pulse (preferably 50-100 microseconds) instead of a spike;

d. the combination of current diversion and voltage pulse holds both the voltage and the current at the anodes of the power switching SCRs below zero for a time adequate for recovery of any positive power SCR previously conducting;

e. the current pulse through L3 charges capacitors C5, C6 and C7 at their common to a voltage slightly higher than the battery voltage. This action produces a back voltage on the cathodes of QP1, QP3, and QP5 which reduces their recombination time and guarantees turn off;

f. the negative switching SCRs QP4, QP6 and QP2 remain on during the positive turn off pulse, thereby permitting free wheeling of the motor, M during the off period;

QC2 is then fired to turn off the negative conducting the power SCRs QP4, QP6 and QP2 to produce the following results:

g. the energy stored in C5, C6 and C7 discharge through L3 and QC2 into L2;

h. the current pulse generated in L2 by the discharge through L3 increases the voltage at the upstream terminal of L2 and the cathodes of QP4, QP6 and QP2 and turns them off. The actual current from C5, C6 and C7 increases the total current flowing in L2 and adds to the voltage pulse at the cathodes of QP4, QP6 and QP2;

i. the discharge of C5, C6 and C7 diverts load current from the anodes of QP2, QP4 and QP6 which guarantees that any negative load SCR which conducted, is turned off. During the off period of SCRs QP4, QP6 and QP2, the positive SCRs remain on to permit free wheeling of the motor windings.

Obviously, the same pulse forming arrangement can be applied to the negative windings L2 instead of, or in addition to, the positive windings L1.

Figure 2:
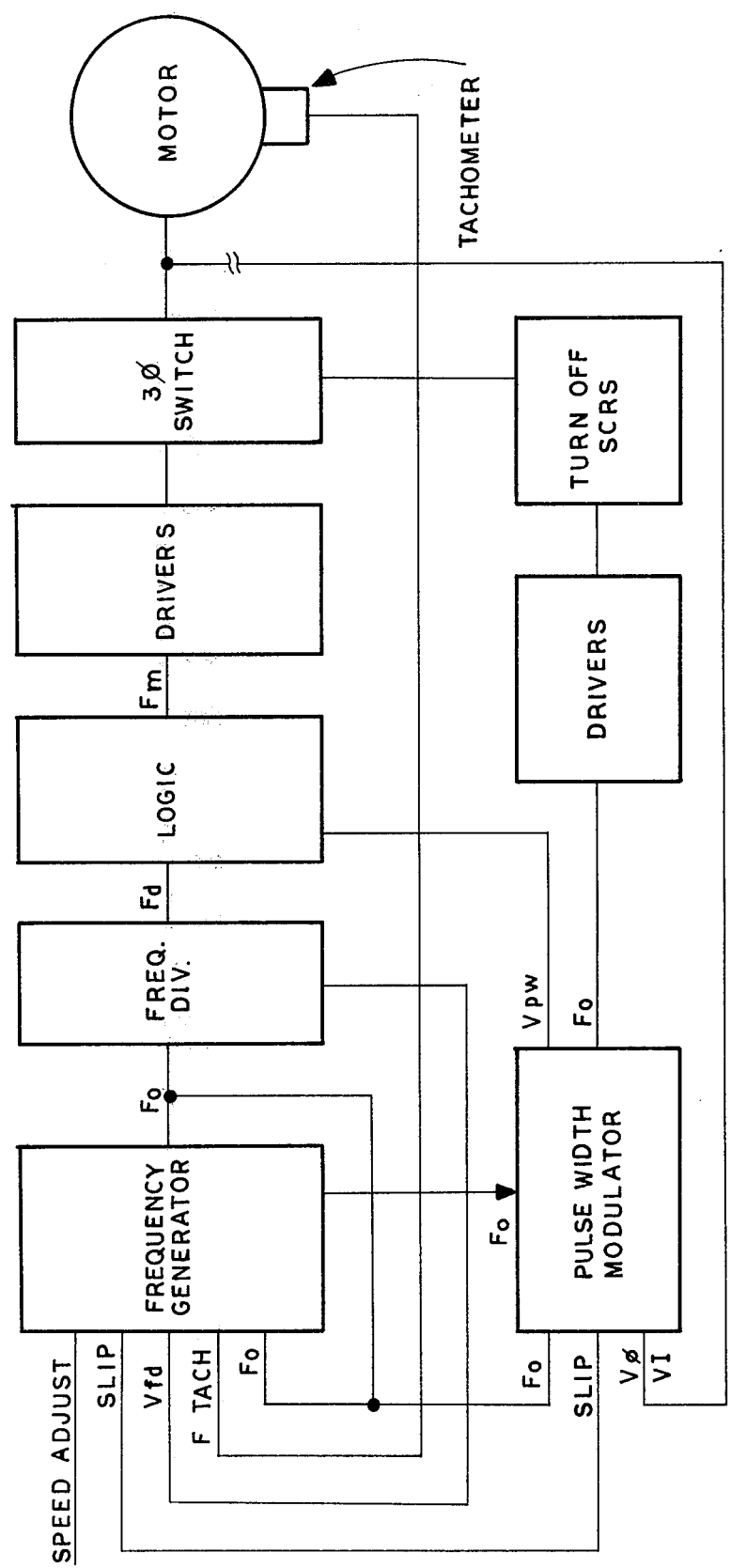
FIG. 2 is a block diagram of the entire system including the turn off circuit; and, FIG. 3 is a circuit diagram of a comparator circuit with a feedback network for reliable switching.

A block diagram of the system is illustrated in FIG. 2. The desired motor speed, determined by the speed control set point, along with the actual speed of the motor, M as determined by a tachometer and the frequency are fed into a frequency generator. When the frequency proportional to oscillator frequency exceeds the tachometer frequency, the slip frequency will be increased until the output becomes some maximum value.

Similarly, when the tachometer frequency exceeds the oscillator frequency, the slip frequency is decreased until ti becomes a negative maximum.

Information from the frequency generator is fed to a frequency divider (for reducing saturation at low speeds) and then to a logic unit which sequences turn on of the SCRs QP1–QP6 and delays the turn on times of the SCRs QC1, QC2. The difference between the time of turn on of SCRs QP1–QP6 and the time of turn on of SCRs QC1, QC2 will determine the pulse width and hence voltage control. A driver circuit amplifies the logic signals to operating levels prior to feeding to a three phase power switch.

A pulse width modulator receives information in oscillator frequency converted to voltage, slip, motor current and voltage proportional to AC voltage delivered to the motor, and determines optimum pulse width times (i.e. voltage) for the motor, M. If desired, current detectors may be provided on one or more legs of the motor winding, and voltage proportional to current is fed back to the pulse width modulator which is varied if the current becomes excessive. For example, slow motor speeds require a shorter pulse width to prevent motor saturation; also, depending on motor speeds, frequency division is employed to reduce "cogging" at low speeds and to avoid harmonics. The pulse width modulation information is then fed to a 180° flip flop for control of amplifier drivers and a turn off control including SCRs QC1 and QC2. The firing time of QC1' is delayed to permit total turn off of QC1.

Figure 3:
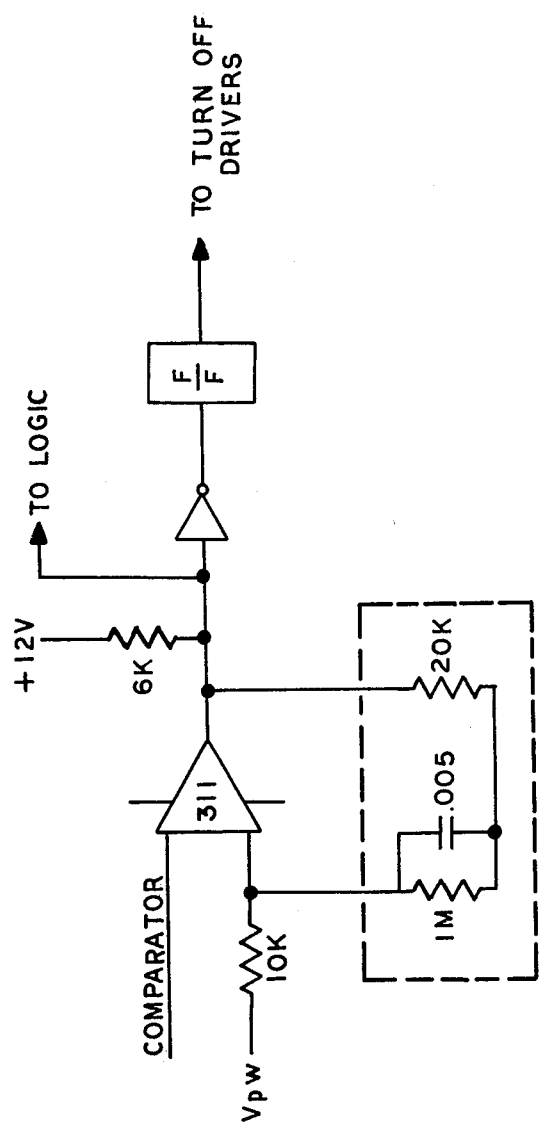

FIG. 3 shows a preferred comparator turn off circuit employing an operational amplifier which provides an excellent switching function; the portion of the circuit in dotted designation is employed to provide a stable feedback.

Consequently, the following improvements are provided over my prior application, Ser. No. 933,656: (a) heat losses in the windings of the three element core are reduced; (b) di/dt requirements of the power SCRs are reduced; (c) recirculating fluxes and back emfs are fed back to the pulse forming capacitors to improve firing characteristics; and, (d) transformer noise is reduced, thereby improving efficiency.

I claim:

1. A turn off circuit for a multiphase motor comprising a DC powered, three element core transformer including:
   i. a central core element having a winding thereon;
   ii. outer core elements bearing loosely coupled positive and negative windings, thereby reducing rf transients, the central and outer windings being closely coupled, thereby enhancing pulse generation;
   iii. a plurality of parallel connected capacitors coupled to an outer winding to fire simultaneously and thereby provide uniform and suitably shaped trapezoidal turn off pulses; and,
   iv. positively and negatively biased turn off SCRs to sequentially fire and admit the turn off pulses to the central winding for switching DC power from the motor.

2. A turn off circuit for a pulse generator having rf inhibiting chokes which comprises a three element core transformer, including:
   i. a central core element having a winding thereon;
   ii. outer core elements bearing loosely coupled positive and negative windings, thereby reducing rf transients; the central element windings and outer element windings being closely coupled for improving pulse generation;
   iii. a plurality of parallel connected capacitors coupled to an outer winding to fire simultaneously and thereby provide uniform and suitably shaped trapezoidal pulses; and,
   iv. positively and negatively biased SCRs to sequentially fire and admit the pulses to the central winding.

3. A turn off circuit comprising two rf inhibiting chokes; a pulse generator; activating SCRs; and, a three element core having a first outer winding connected to a positive bus; a second outer winding connected to a negative bus, the outer windings being loosely coupled; and a central winding closely coupled to the outer windings; rf inhibiting choke action being provided by the outer windings, and enhanced pulse generation being provided by the central winding; the central winding being connected between a pair of positively and negatively biased turn on SCRs; and, a plurality of capacitors coupled in parallel to a central and an outer winding to fire simultaneously and thereby produce uniform and suitably shaped trapezoidal turn off pulses.

4. A control system and turn off circuit for a multiphase motor driven from a DC supply comprising a speed control; a frequency generator; a plurality of power SCRs for switching the DC supply to the motor, the frequency output being adapted to control actual motor speed by means of the power SCRs; a logic circuit for sequential switching of the power SCRs and on off switching of turn off SCRs; a pulse width modulator for applying an optimum pulse width to the motor in response to voltage, frequency, slip and voltage delivered to the motor, the pulse width controlling the on off SCRs; and, a DC powered three element core transformer including: a central bore element having a winding thereon; outer core elements having loosely coupled positive and negative windings, thereby reducing rf transients; the central and outer windings being closely coupled, thereby enhancing pulse generation; and, a plurality of parallel connected capacitors coupled to an outer winding to fire simultaneously and thereby provide uniform and suitably shaped trapezoidal pulses to turn off the SCRs and admit the turn off pulses to the control winding for switching DC power from the motor.

5. The turn off circuit of claims 1 or 4, comprising auxiliary windings on the outer cores for transferring trapped energy to a power source for the turn off circuit.

6. The turn off circuit of claims 1 or 4, comprising auxiliary windings on the outer cores for transferring trapped energy to a power source for the turn off circuit, and an energy transfer circuit employed in conjunction with the outer core bearing the pulse forming capacitors, the energy transfer circuit comprising a diode, SCR and air choke.

7. The turn off circuit of claims 1 or 4 in which the turn off pulse has a duration of about 50–100 microseconds.

8. The turn off circuit of claims 1 or 4 comprising a choke and capacitor smoothing circuit for transferring discharge energy from the capacitors to the switching SCRs.

9. The control system of claim 4 comprising a comparator turn off circuit including an operational amplifier and feedback therefor, the feedback including an RC network filter, the capacitance being shunted by a resistance.

* * * * *